United States Patent
Parker et al.

(10) Patent No.: US 10,554,815 B2
(45) Date of Patent: Feb. 4, 2020

(54) SYSTEM AND METHOD FOR ESTABLISHING COMMUNICATIONS OVER A PLURALITY OF COMMUNICATIONS PLATFORMS

(71) Applicant: Vonex Ltd, Milton, Queensland (AU)

(72) Inventors: Angus Adrian Parker, Melbourne (AU); Mathew Brian Michael Fahey, Brisbane (AU)

(73) Assignee: Vonex Ltd., Milton (AU)

(*) Notice: Subject to any disclaimer, the term of this patent is extended or adjusted under 35 U.S.C. 154(b) by 0 days.

(21) Appl. No.: 16/217,075

(22) Filed: Dec. 12, 2018

(65) Prior Publication Data
US 2019/0116263 A1    Apr. 18, 2019

Related U.S. Application Data

(63) Continuation of application No. 15/739,213, filed as application No. PCT/AU2016/050537 on Jun. 24, 2016, now abandoned.

(30) Foreign Application Priority Data

Jun. 24, 2015  (AU) ................................ 2015902480

(51) Int. Cl.
*H04M 3/46* (2006.01)
*H04L 12/66* (2006.01)
(Continued)

(52) U.S. Cl.
CPC ............ *H04M 3/465* (2013.01); *H04L 12/66* (2013.01); *H04L 61/1594* (2013.01);
(Continued)

(58) Field of Classification Search
CPC ............. H04M 1/2535; H04M 1/2745; H04M 1/274508; H04M 1/72547;
(Continued)

(56) References Cited

U.S. PATENT DOCUMENTS 9,723,147 B1*  8/2017  Kammeyer ........... G06F 16/285
2007/0143397 A1*  6/2007  Guedalia ........... H04L 29/12047
                                                        709/203
(Continued)

FOREIGN PATENT DOCUMENTS

WO    2012122494 A1    9/2012

*Primary Examiner* — Nathan S Taylor
(74) *Attorney, Agent, or Firm* — Hodgson Russ LLP

(57) ABSTRACT

A system and method for establishing communications enables an outbound communication to be made simultaneously across a plurality of different communications platforms. The system is configured to perform the following: receive from a user, a first request to establish an electronic communication with a contact; identify via the details of contacts stored in a storage device, a contact identifier of the contact for each of a plurality of the different electronic communications platforms; receive at a processor from the user, selected devices of the user with which to establish the electronic communication with the contact; transmit via one of the selected devices of the user, a second request to establish an electronic communication comprising real time audio data with the contact simultaneously via each of the plurality of the different electronic communications platforms using each respective contact identifier; receive via the communications device, an acceptance of the second request to establish an electronic communication with the contact via one of the plurality of different electronic communications platforms; and establish an electronic communication comprising real time audio data between the contact and the one of the selected devices of the user via the one of the plurality of different electronic communications platforms.

16 Claims, 11 Drawing Sheets

(51) Int. Cl.
  *H04M 1/2745* (2006.01)
  *H04L 29/12* (2006.01)
  *H04M 3/42* (2006.01)
  *H04M 1/253* (2006.01)
(52) U.S. Cl.
  CPC . *H04M 1/27455* (2013.01); *H04M 1/274508* (2013.01); *H04M 3/42374* (2013.01); *H04M 1/2535* (2013.01); *H04M 2203/60* (2013.01)
(58) Field of Classification Search
  CPC ....... H04M 2250/66; H04M 1/274516; H04M 1/72561; H04M 1/72519; H04M 1/57; H04M 1/663; H04M 1/72522; H04M 1/72527; H04M 1/7253; H04M 1/72566; H04M 1/72572; H04M 1/27455; H04M 2203/60; H04M 3/42374; H04M 3/465; H04L 51/043; H04L 67/22; H04L 12/5815; H04L 29/12122; H04L 51/36; H04L 61/1547; H04L 61/1594; H04L 67/18; H04L 67/24; H04L 12/589; H04L 67/146; H04L 67/36; H04L 12/66; H04W 4/001

USPC ....... 370/259, 328, 352, 353, 354, 355, 356, 370/401; 455/412.1, 413
  See application file for complete search history.

(56) References Cited

U.S. PATENT DOCUMENTS

| | | | |
|---|---|---|---|
| 2008/0059627 A1* | 3/2008 | Hamalainen | H04L 51/043 709/224 |
| 2008/0133580 A1* | 6/2008 | Wanless | H04L 29/12122 |
| 2011/0267985 A1* | 11/2011 | Wilkinson | H04M 1/2535 370/259 |
| 2012/0232978 A1* | 9/2012 | Steul | H04W 4/21 705/14.25 |
| 2015/0172419 A1* | 6/2015 | Toledo | H04L 67/42 709/203 |
| 2016/0150089 A1* | 5/2016 | Garg | H04M 7/003 370/352 |
| 2016/0366093 A1* | 12/2016 | Narayanan | H04L 61/106 |
| 2017/0180526 A1* | 6/2017 | Shukla | H04M 1/274508 |

* cited by examiner

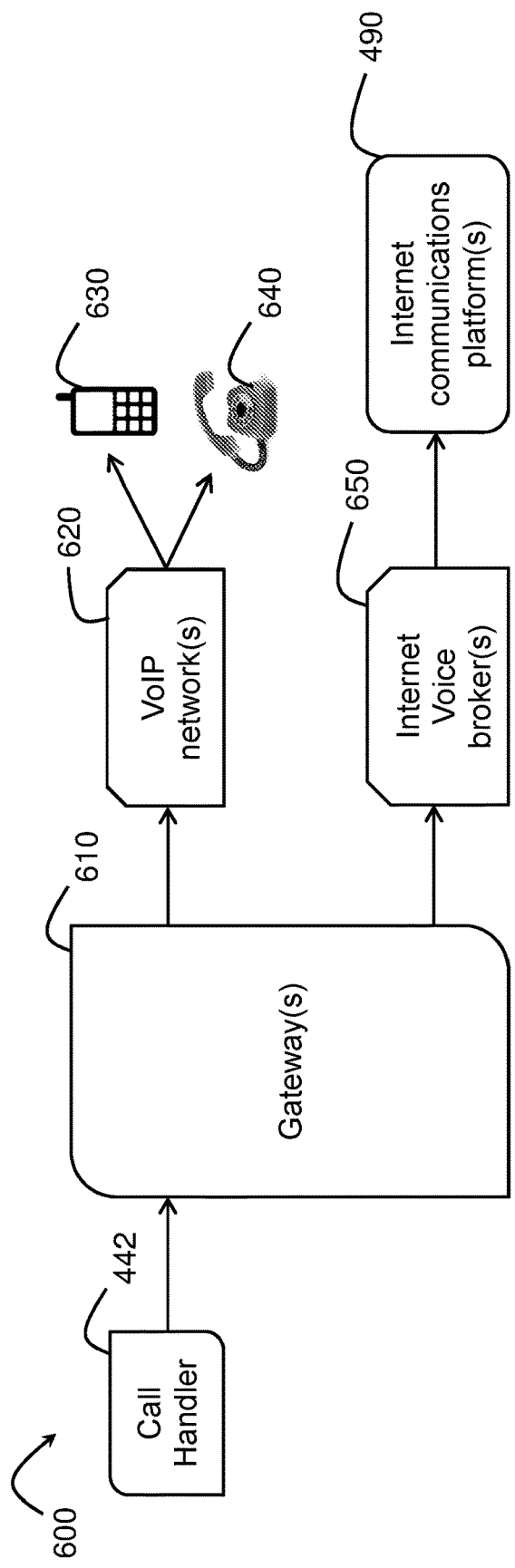
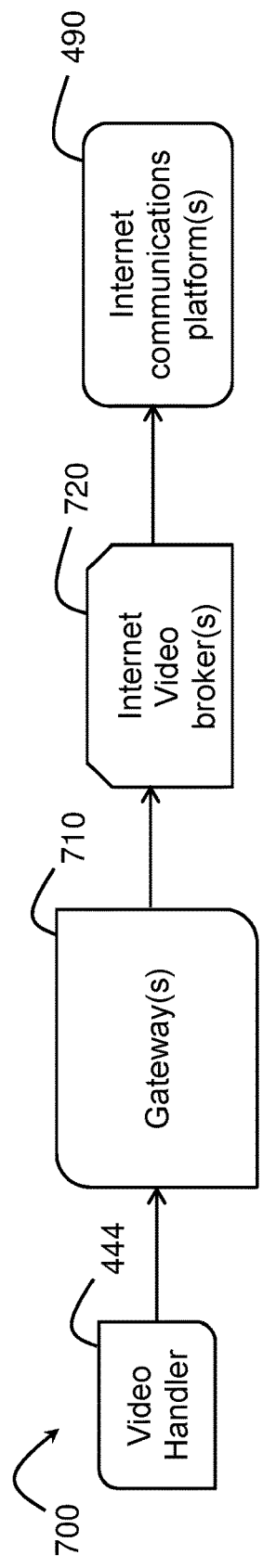

SYSTEM AND METHOD FOR ESTABLISHING COMMUNICATIONS OVER A PLURALITY OF COMMUNICATIONS PLATFORMS

FIELD OF THE INVENTION

The present invention relates to systems and computer implemented methods for establishing communications. In particular, the present invention relates to systems and computer implemented methods for establishing communications over and/or between a plurality of different communications platforms.

BACKGROUND TO THE INVENTION

Communications technologies provide an important means for people to contact one another at a distance. Traditionally, communications at a distance were conducted via telephone for spoken communications and via mail for written communications. However, the emergence of the Internet and mobile technologies, such as smart phones, has enabled many new communication platforms to be developed. These communications platforms include mobile telephony, internet telephony, email, personal messaging services and social media services.

A single smart phone will often include a separate app for communicating via each of a plurality of communication platforms. For example, to dial another mobile phone or a home phone, a user of the smart phone may attempt to establish a connection through a mobile communications network via a dialer app, through the Skype network via a Skype app or through the Viber network via a Viber app. Similarly, to send a text message to another mobile phone or computing device, a user may send the message through a Short Message Service (SMS) using an SMS app, through email using an email app or through a personal messaging service using a personal messaging app, such as, WhatsApp or Facebook Messenger.

While having access to a diverse range of communications platforms from a smart phone provides choice for users, a contact is not always available on a communications platform associated with the app. Therefore, a user often has to attempt to call the contact via different apps associated with different communications platforms before a connection with the contact is established.

OBJECT OF THE INVENTION

It is a preferred object of the invention to provide systems and computer implemented methods for establishing communications that address or ameliorate one or more of the aforementioned problems of the prior art and/or provides a useful commercial alternative.

SUMMARY OF INVENTION

The present invention relates to systems and computer implemented methods for establishing communications. In particular, the present invention relates to systems and computer implemented methods for establishing communications over and between a plurality of different communications platforms.

In one form, although not necessarily the broadest form, the invention resides in a system for establishing communications, the system comprising:

a processor;

a communications device connected to the processor, the communications device configured to communicate with different electronic communications platforms; and a storage device connected to the processor, the storage device storing details of contacts for the different electronic communications platforms and computer readable code components configured to perform the following when executed by the processor:

receive from a user, a first request to establish an electronic communication with a contact;

identify via the details of contacts stored in the storage device, a contact identifier of the contact for each of a plurality of the different electronic communications platforms;

receive at the processor from the user, selected devices of the user with which to establish the electronic communication with the contact;

transmit via one of the selected devices of the user, a second request to establish an electronic communication comprising real time audio data with the contact simultaneously via each of the plurality of the different electronic communications platforms using each respective contact identifier;

receive via the communications device, an acceptance of the second request to establish an electronic communication with the contact via one of the plurality of different electronic communications platforms; and establish an electronic communication comprising real time audio data between the contact and the one of the selected devices of the user via the one of the plurality of different electronic communications platforms.

Suitably, an electronic communication comprising real time audio data is established between one or more contacts via the plurality of different electronic communications platforms and one or more devices of the user.

Preferably, the storage device stores details of contacts for the different electronic communications platforms including one or more of the following contact identifiers:

a user identifier for each of one or more internet communications platforms; and one or more telephone numbers.

Preferably, the storage device stores details of contacts for the different electronic communications platforms including an availability identifier for each contact for each of the different electronic communications platforms.

Suitably, the storage device stores computer readable code components configured to perform the following when executed by the processor:

transmit via the communications device to a server of each of the different electronic communications platforms for each contact, an availability request requesting an availability status of the contact on the respective electronic communications platform; and based on the response from each server to each availability request, update the availability identifier for each contact for each of the different electronic communications platforms.

Preferably, the storage device stores details of users including a user identifier and a security key for each user.

Suitably, the first request includes a user identifier and a security key and the storage device stores computer readable code components configured to perform the following when executed by the processor:

determine the security key for the user from the storage device using the user identifier;

compare the security key from the storage device with the security key of the first request; and transmit the second request only if the security key from the storage device with the security key of the first request are the same.

Suitably, the storage device stores details of users including one or more of the following for each user:

a location identifier;

an account balance; and a call history.

In another form, although not necessarily the broadest form, the invention resides in a computer implemented method for establishing a communication, the method comprising:

receiving at a processor from a user, a first request to establish an electronic communication with a contact;

identifying via a contact database using the processor, a contact identifier of the contact for each of a plurality of different electronic communications platforms; and transmitting via a communications device in communication with the processor, a second request to establish an electronic communication with the contact via each of the plurality of different electronic communications platforms using the respective contact identifier.

Preferably, the computer implemented method further comprises:

receiving at the processor via the communications device, an acceptance of the second request via one of the plurality of different electronic communications platforms; and establishing an electronic communication between the contact and the user via the one of the plurality of different electronic communications platforms.

Suitably, the computer implemented method further comprises:

receiving at the processor from the user, a selection of devices of the user with which to establish the electronic communication with the contact; and establishing an electronic communication between the contact and the selected devices of the user.

Suitably, the computer implemented method further comprises:

identifying using the processor, an availability of the contact on different electronic communications platforms; and selecting the plurality of different electronic communications platforms based on the availability of the contact.

Suitably, the availability of the contact on different electronic communications platforms is identified via a presence database, and the computer implemented method further comprises:

periodically transmitting via the communications device to a server of each of the different electronic communications platforms, an availability request requesting an availability status of the contact on the respective electronic communications platform; and updating the presence database based on a response from each server to each availability request.

Suitably, the plurality of different electronic communications platforms are selected from the following:

a landline;

a mobile telephone network; and one or more different internet communications platforms.

Suitably, the contact identifiers include one or more of the following:

a telephone number; and a user identifier for each of one or more internet communications platforms.

Suitably, the computer implemented method further comprises:

receiving at the processor, a security key associated with the first request;

comparing via the processor, the security key with a security key stored in a user database; and transmitting the second request only if the security key associated with the first request matches the security key stored in the user database.

In yet another form, although not necessarily the broadest form, the invention resides in a computer implemented method for establishing a communication, the method comprising:

receiving at a processor from a user, a first request to establish an electronic communication with a contact;

identifying via a contact database using the processor, a contact identifier of the contact for each of a plurality of different electronic communications platforms;

receiving at the processor from the user, selected devices of the user with which to establish the electronic communication with the contact;

transmitting via one of the selected devices of the user in communication with the processor, a request to establish an electronic communication comprising real time audio data to the contact simultaneously via each of the plurality of different electronic communications platforms using the respective contact identifier;

receiving at the processor via the communications device, an acceptance of the second request via one of the plurality of different electronic communications platforms; and establishing an electronic communication comprising real time audio data between the contact and the one of the selected devices of the user via the one of the plurality of different electronic communications platforms.

In a further form, although not necessarily the broadest form, the invention resides in a computer implemented method for establishing a communication, the method comprising:

receiving at a processor from a user, a first request to establish an electronic communication with a contact, the first request including a selection of one or more electronic communications platforms from a plurality of different electronic communications platforms;

identifying via a contact database using the processor, a contact identifier of the contact for each of the selected electronic communications platforms;

receiving at the processor from the user, selected devices of the user with which to establish the electronic communication with the contact;

transmitting via one of the selected devices of the user in communication with the processor, a second request to establish an electronic communication comprising real time audio data with the contact simultaneously via each of the selected electronic communications platforms using the respective contact identifier;

receiving at the processor via the communications device, an acceptance of the second request via one of the selected electronic communications platforms; and establishing an electronic communication comprising real time audio data between the contact and the one of the selected devices of the user via the one of the selected electronic communications platforms. Further forms and/or features of the present invention will become apparent from the following detailed description.

BRIEF DESCRIPTION OF THE DRAWINGS

In order that the invention may be readily understood and put into practical effect, reference will now be made to preferred embodiments of the present invention with reference to the accompanying drawings, wherein like reference numbers refer to identical elements. The drawings are provided by way of example only, wherein:

FIG. 6 illustrates a system including a call handler for handling requests for voice calls to mobile devices, landlines and/or internet communications platforms, according to one embodiment of the invention;

FIG. 7 illustrates a system including a video handler for handling requests for video communications via internet communications platforms, according to one embodiment of the invention;

Figure 1:
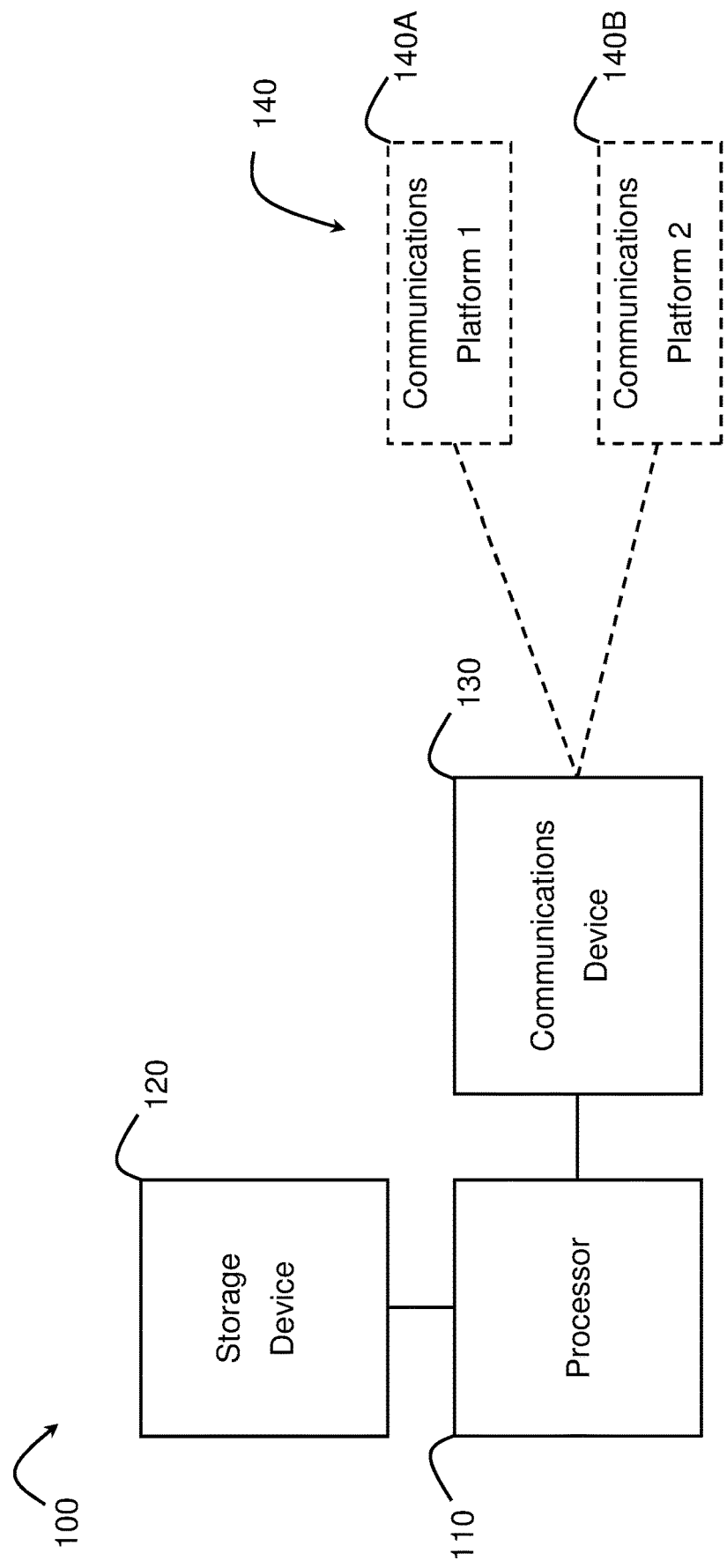
FIG. 1 illustrates a system for establishing communications, according to one embodiment of the invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DESCRIPTION OF THE INVENTION

The present invention relates to systems and computer implemented methods for establishing communications. In particular, the present invention relates to systems and computer implemented methods for establishing communications over and/or between a plurality of different communications platforms.

FIG. 1 illustrates a system 100 for establishing communications, according to one embodiment of the invention. The system 100 comprises: a processor 110, a storage device 120 connected to the processor 110, and a communications device 130 connected to the processor 110.

The communications device 130 is configured to communicate with a plurality of different electronic communications platforms 140, such as platforms 140A and 140B. For example, the processor 110 may send or receive requests, or establish an electronic communication between two or more parties via the different electronic communications platforms 140 using the communications device 130.

The storage device 120 stores details of contacts for the different electronic communications platforms 140. For example, the storage device 120 stores details of contacts for the different electronic communications platforms 140 including a user identifier for each of one or more internet communications platforms and/or one or more telephone numbers. In some embodiments, the details of contacts for the different electronic communications platforms 140 include an availability identifier for each contact for each of the different electronic communications platforms.

The storage device 120 also stores computer readable code components. The computer readable code components are configured to, when executed by the processor, perform one or more methods described herein.

Figure 2:
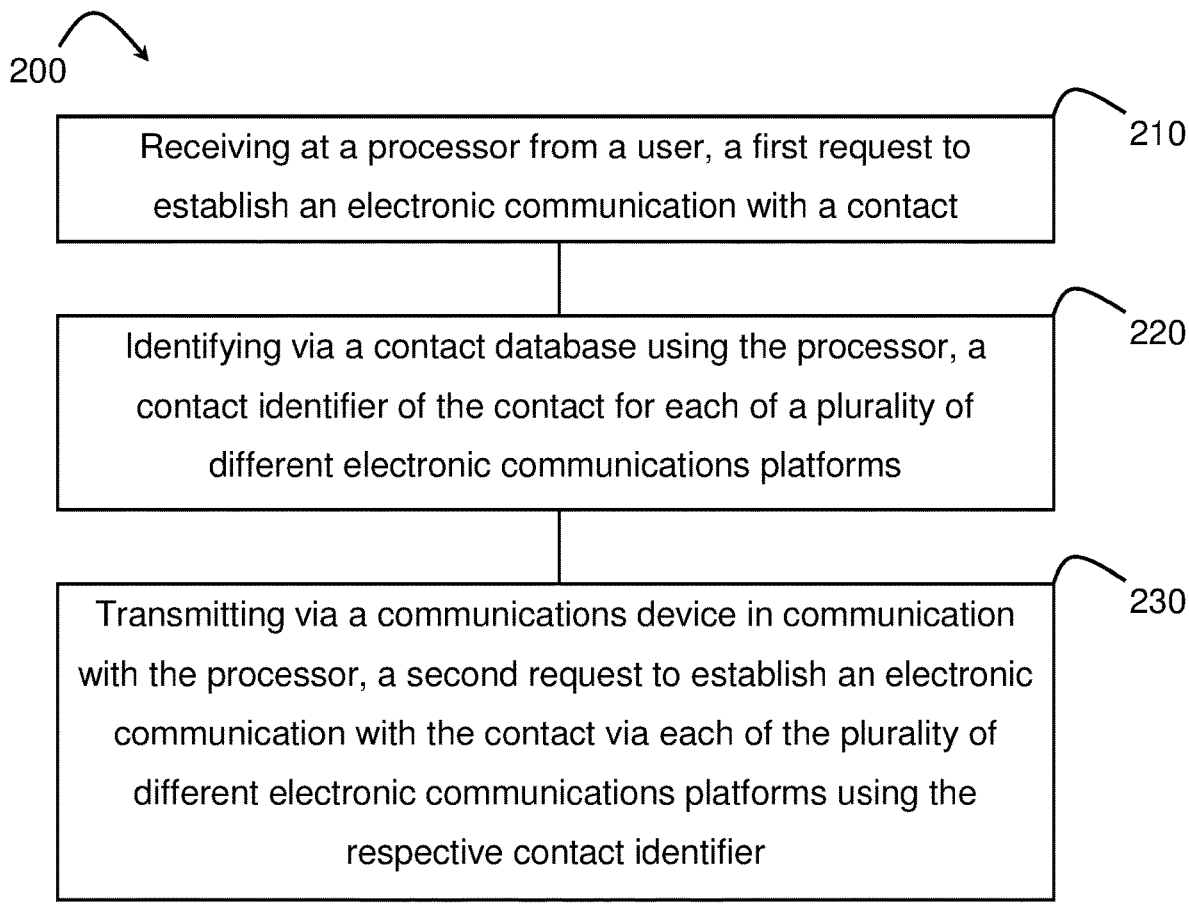
FIG. 2 illustrates a method for establishing communications, according to one embodiment of the invention.

FIG. 2 illustrates a method 200 for establishing communications, according to one embodiment of the invention. In some embodiments, the method 200 is performed in the system 100. The method 200 comprises the following steps.

At step 210, the method 200 comprises receiving at a processor from a user, a first request to establish an electronic communication with a contact.

At step 220, the method 200 comprises identifying via a contact database using the processor, a contact identifier of the contact for each of a plurality of different electronic communications platforms.

At step 230, the method 200 comprises transmitting via a communications device in communication with the processor, a second request to establish an electronic communication with the contact via each of the plurality of different electronic communications platforms using the respective contact identifier.

Figure 3:
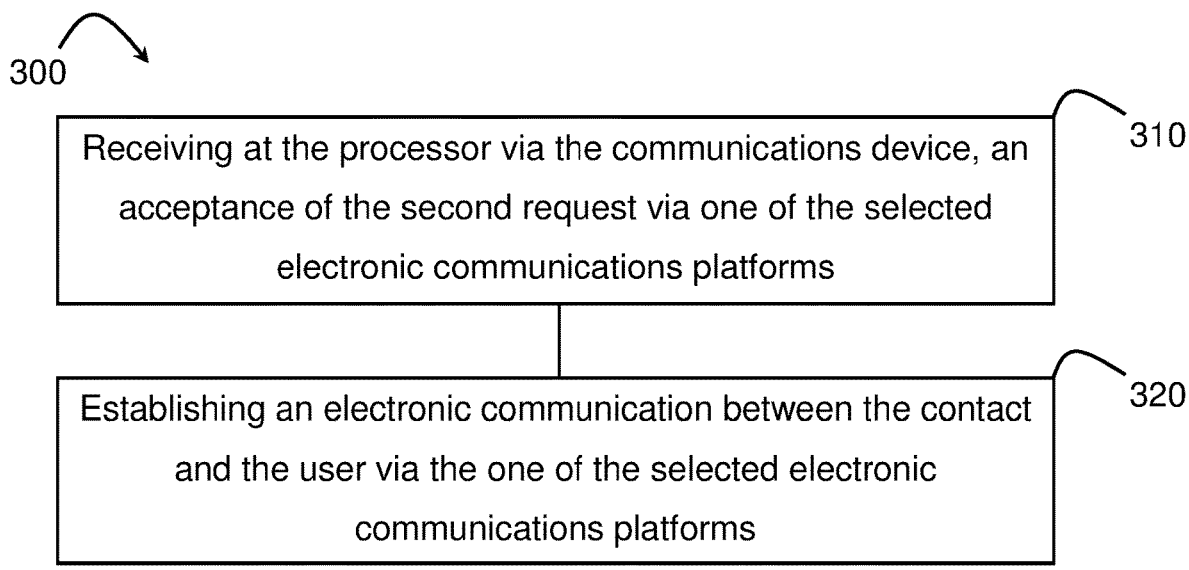
FIG. 3 illustrates a method to be performed with the method of FIG. 2, according to one embodiment of the invention.

FIG. 3 illustrates a method 300 for establishing communications, according to one embodiment of the invention. The method 300 is performed after the method 200, for example, in the system 100. The method 300 comprises the following steps.

At step 310, the method 300 comprises receiving at the processor via the communications device, an acceptance of the second request via one of the selected electronic communications platforms.

At step 320, the method 300 comprises establishing an electronic communication between the contact and the user via the one of the selected electronic communications platforms.

Figure 4:
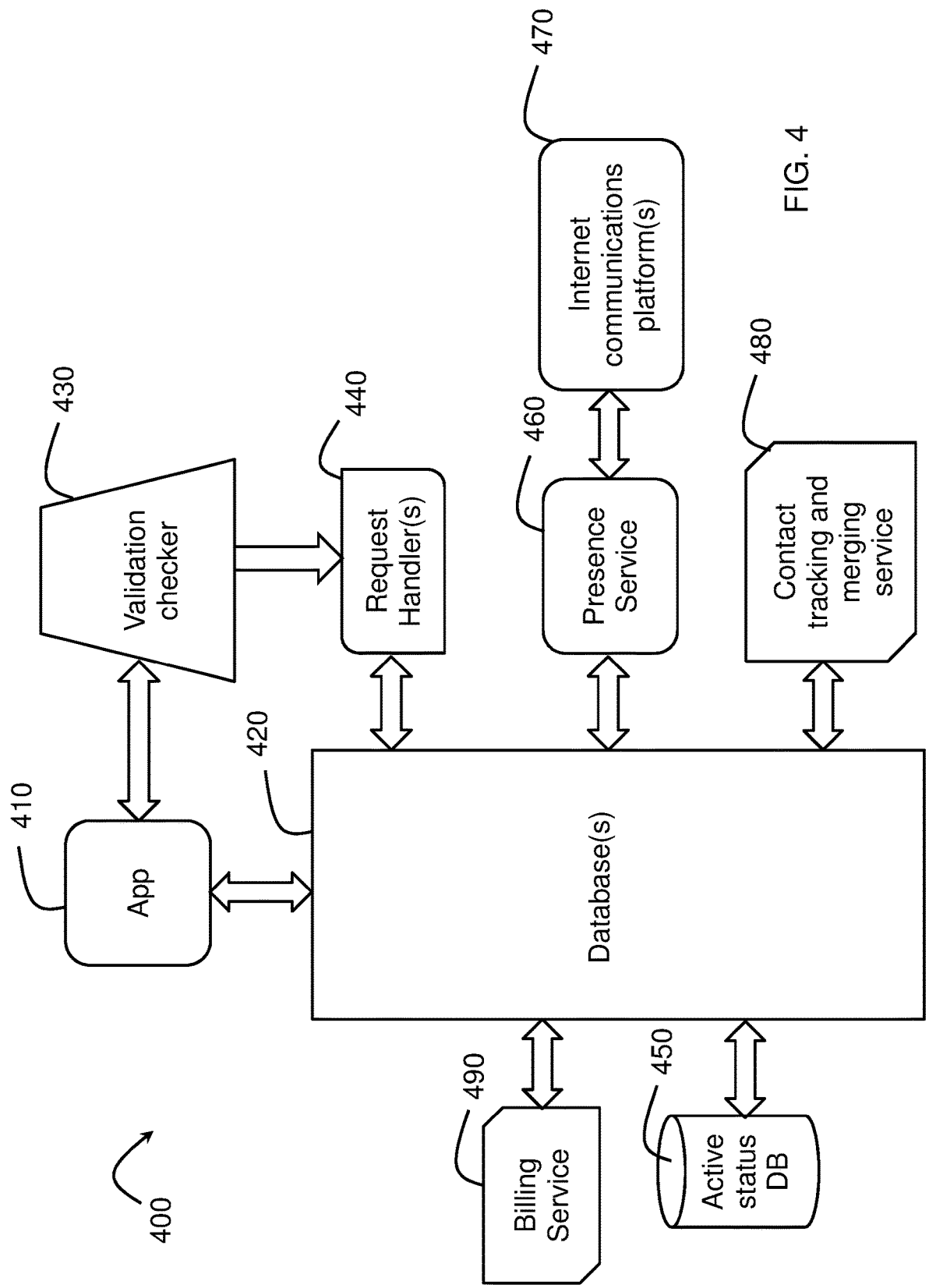
FIG. 4 illustrates a system for establishing communications, according to one embodiment of the invention.

FIG. 4 illustrates a system 400 for establishing communications, according to one embodiment of the invention. In some embodiments, the system 400 is implemented in the system 100. The system 400 comprises an app 410 in communication with one or more databases 420. The app can be executed on a device, such as, a smart phone or a tablet.

The one or more databases 420 store user details and/or contact details. The user details and/or contact details can include, for example, contact identifiers of contacts for each of a plurality of different electronic communications platforms. In some embodiments, the one or more databases 420 are deployed at multiple sites and replicated between the multiple sites in real-time. For example, the multiple sites may be located in different countries or regions to enable the database to minimise the latency for connections from devices in the respective country or region.

The one or more databases 420 and the app 410 are in communication with one or more request handlers 440. The one or more request handlers 440 receive requests from the app 410 to establish communications between the app 410 and contacts via a plurality of different communications platforms. For example, a request including a contact identifier for a contact for each of a plurality of different communications platforms is sent to the one or more request handlers 440 from the device 405.

When the request is sent to the one or more request handlers 440, a validation check is performed by a validation checker 430. The validation checker 430 ensures that the request is from a valid and/or authorised account. For example, a user identifier and security key are input by the user via the app, or retrieved from the one or more databases 420, and sent to the one or more request handlers 440 with the request. The validation checker 430 then determines a correct security for the user using the user identifier and compares the security key sent with the request with the correct security key. If the security keys match then the request handler 440 attempts to establish an electronic communication with the contact via each of the plurality of the different electronic communications platforms using each respective contact identifier.

The one or more databases 420 are in communication with an active status database 450. The active status database 450 stores a status of the user using the app 410 on a device and the statuses of other users using the app 410 on other devices. The status can be, for example, offline, busy or available. The status in the active status database 450 is updated from the one or more databases 420 and/or the app 410 of each device when the user of the respective device changes the status in the app 410.

An app status of each contact in the one or more databases 420 can be updated from the active status database 450. When a request to establish an electronic communication with a contact is received, the app 410 and/or a request handler 440 can use the app status of the contact to determine if the contact is available to contact via the app 410 on the contact's device and can attempt to establish a communication with the contact via the app 410 on the contact's device.

In some embodiments, the active status database also stores a location of each user. The location can be used, for example, to determine a best call route to the contact and/or a local time at the contact's location.

The one or more databases 420 are also in communication with a presence service 460. The presence service 460 monitors the status of one or more users on one or more internet communications platforms 470. The presence service 460 sends requests for the status of each of the one or more users to one or more internet communications platforms 470 and receives the respective statuses in response to the requests.

Internet communications platform statuses of each user and/or contact can be updated in the one or more databases 420 from the presence service 460, for example, periodically or when a request is received at the request handler 440. When a request to establish an electronic communication with a contact is received, the app 410 and/or the request handler 440 can use the internet communications platform statuses of the contact to determine the internet communications platforms 470 on which the contact is available or present. The app 410 and/or request handler 440 can then select or determine the internet communications platforms 470 via which to attempt to establish a communication with the contact based on the internet communications platform statuses. For example, only the internet communications platforms 490 on which the contact is available are selected.

The one or more databases 420 are in communication with a contact merging and tracking service 480. The contact merging and tracking service 480 adds and/or updates the contacts in the one or more databases 420. For example, the contact merging and tracking service 470 retrieves and merges contact details, lists of contacts and/or contact identifiers from the internet communications platforms 470 and adds them to the database 420. The merging of contacts avoids duplication of contacts or contact details, and assigns contact details from a plurality of different communications platforms to each contact.

The one or more databases 420 and the app 410 are in communication with a billing service 490. The user of the app 410 can purchase credit via the billing service 490 for spending on communications. For example, in some embodiments, credit can be purchased via Google wallet or an iTunes account.

The billing service 490 tracks the communications established via the app 410 and the duration of the communications. The billing service 490 determines an amount of credit used by the user for each communication based, for example, on the type of communication and the duration of the communication. The billing service 490 subtracts the amount of credit used by the user from the credit held by the user. If the user has insufficient credit, the billing service 490 may block the app 410 and/or the one or more request handlers 440 from establishing a communication.

In a first example, where the communication is established between the user and an app 410 of a contact, the billing service 460 does not deduct any credit for the electronic communication, i.e. the electronic communication is free. In a second example, where the communication is established between the user and another internet communications platform 470, the billing service 490 may not deduct any credit, or may deduct credit based on connections established and/or time connected. In a third example, where the communication is established between the user and a mobile phone or landline, the billing service 490 may deduct credit based on connections established, the destination country of the connection and/or time connected. In some embodiments, the request handler 440 will determine a lowest cost path for communications established between the user and a mobile phone or landline.

Figure 5:
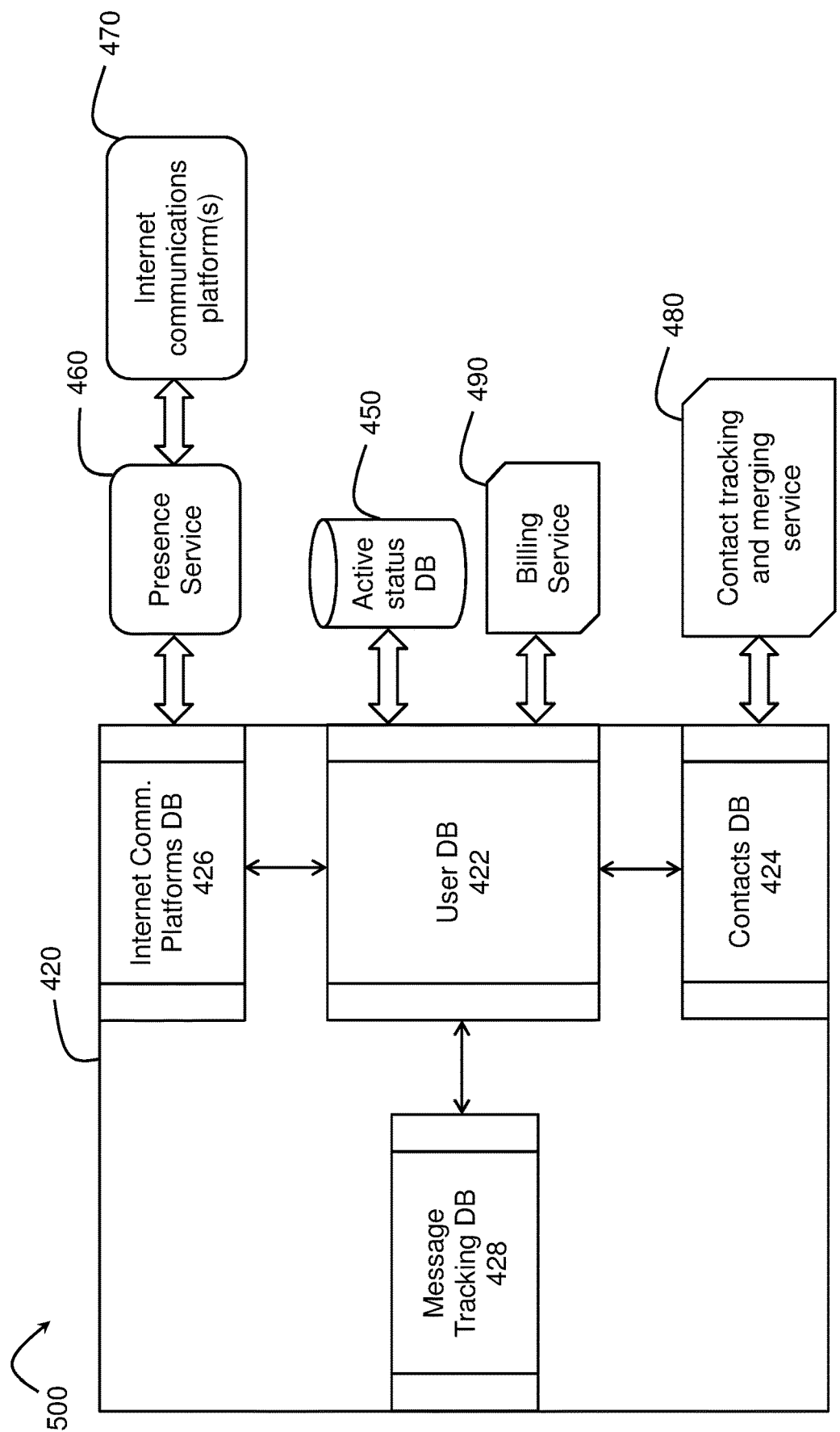
FIG. 5 illustrates a system for establishing communications, according to one embodiment of the invention.

FIG. 5 illustrates a system 500 for establishing communications, according to one embodiment of the invention. The system 500 is an implementation of the system 400 in which the one or more databases 420 include a user database 422, a contacts database 424, an internet communications platforms database 426 and a message tracking database 428. The details in each database can be mirrored in the other databases where needed.

The user database 422 stores user details for users of the app 410. For example, for each user, the user database 422 stores one or more of the user identifier, the security key, contact details for each user, user login details of the user for one or more internet communications platforms, and a call history of the user. The user identifier can be, for example, a username or an email address, and the security key can be, for example, an encrypted key or a password. The user database 422 also stores the current status of the user, which is mirrored in the active status database 450, and an account balance of the user, which is updated from the billing service 490. In some embodiments, the user database 422 stores a location of the user, which enables the request handler 440 to determine whether a requested communication is an international communication.

The contacts database 424 stores contact details. For example, the contacts database 424 stores a list of contacts for each user and contact details of the contacts for one or more communications platforms. The contact details can be populated from the contact merging and tracking service 480. The contact details can include, for example, a contact identifier identifying the contact on the app 410, user identifiers of the contact for one or more internet communications platforms, a name of the contact, one or more telephone numbers of the contact, one or more email addresses of the contact, a presence or availability of the contact on the one or more internet communication platforms, the current location of the contact and a list of previously known locations for the user. Additional information that may be desired to be stored about a contact can be placed in a key-value store. Information in the key-value store can optionally be shared between different groups present in one or more user databases 422.

The internet communications platforms database 426 stores account details or identifiers of one or more users and/or contacts for one or more internet communication platforms. For example, the internet communications platforms database 426 stores one or more of the following for each user or contact: a user identifier; and one or more internet communications platform account identifiers, usernames and/or corresponding passwords. The contacts database 424 stores a status or availability of the user on the one or more internet communications platforms. The status or availability is updated by the presence service 460 using the one or more internet communications platform account identifiers, usernames and/or corresponding passwords from the internet communications platforms database 426.

The message tracking database 428 stores message details, such as, details of messages, message threads, message groups and user(s)/contact(s) involved. For example, the message tracking database 428 stores one or more of the following message details for a message: one or more user or contact identifiers associated with the message, a message identifier identifying the message, the message group or thread identifier identifying a group or thread of messages to which the message belongs, a message date and/or time, and other media associated with a message. The one or more users and/or contacts referenced in the message details can be identified via the user database 422 and/or the contacts database 424.

In some embodiments, the request handler 440 comprises request handlers to handle different types of communications requests. In preferred embodiments, the request handlers communicate with internet communications brokers, communications networks, such as, Voice over Internet Protocol (VoIP) networks and public switched telephone networks (PSTN), and/or other devices via one or more gateways. The one or more gateways can include separate gateways for each country and/or each network or service. In some embodiments, communications will be routed via the path that has the lowest cost. For example, international communications to landlines or mobile devices can be established using VoIP or internet messaging services to lower the costs.

In some embodiments, the user database 422 stores separate identifiers for the user identifier for each request handler. The separate identifiers can be sent with the request to identify the user and the request handler via which the user is attempting to establish a communication.

FIG. 6 illustrates a system 600 including a call handler 442 for handling requests for voice calls to mobile devices 630, landlines 640 and/or internet communications platforms 490, according to one embodiment of the invention. The call handler 442 communicates via one or more gateways 610 with one or more VoIP networks 620 and one or more internet voice brokers 650 associated with the one or more internet communications platforms 490. The call handler 442 attempts to establish connections with mobile devices 630 and/or landlines 640 via the one or more VoIP networks 620. The one or more VoIP networks 620 communicate with the mobile devices 630 and/or landlines 640 via Public Switched Telephone Networks (PSTNs) where necessary. For example, the one or more VoIP networks can include the networks provided by Vocus, Level 3, Symbio or TATA. The call handler 442 attempts to establish connections with one or more internet communications platforms 490 via the one or more internet voice brokers 650. For example, the internet voice brokers 650 can include brokers such as Skype, Line or Viber.

In some embodiments, the app 410 is connected directly to the one or more VoIP networks 620 and/or one or more of the internet communications platforms 490 when a connection is established. The call handler 442 and/or the app 410 communicate via the one or more gateways 610, for example, using a session initiation protocol (SIP) and a real-time protocol (RTP). In some embodiments, a software platform, such as, Freeswitch or OpenSIPs is implemented to establish the communications.

In some embodiments, the app 410 provides a user interface that allows showing all currently connected calls that are active on one or more gateways 610. The user who initiated the call on the app 410 can choose to disconnect any calls currently connected on the call handler 442. In some embodiments, the user who initiated the call on the app 410 may choose to allow other users to take over or share this control.

FIG. 7 illustrates a system 700 including a video handler 444 for handling requests for video communications via internet communications platforms 490, according to one embodiment of the invention. The video handler 444 communicates via one or more gateways 710 with one or more internet video brokers 720 associated with the one or more internet communications platforms 490. The video handler 444 attempts to establish connections with one or more internet communications platforms 490 via the one or more internet video brokers 720. For example, the internet video brokers 720 can include brokers such as Skype or Line.

In some embodiments, the app 410 is connected directly to one or more of the internet communications platforms 490 when a connection is established. In some embodiments, a software platform, such as, Freeswitch is implemented to establish the communications.

Figure 8:
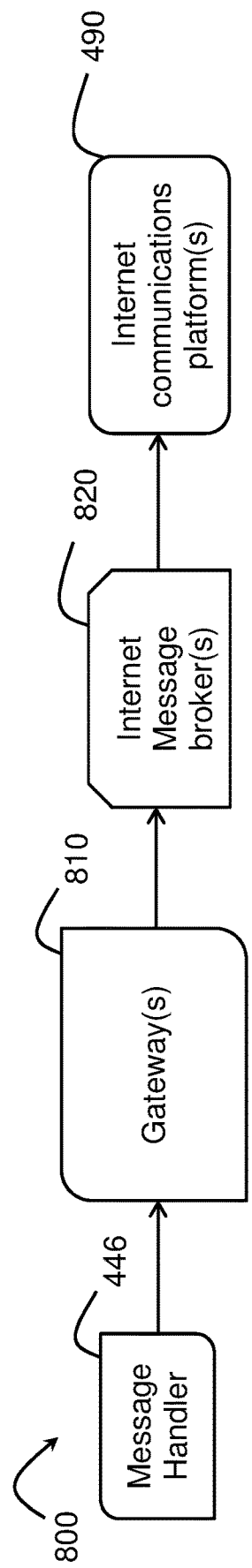
FIG. 8 illustrates a system including a message handler for handling requests for sending messages to mobile devices and/or internet communications platforms, according to one embodiment of the invention.

FIG. 8 illustrates a system 800 including a message handler 446 for handling requests for sending messages to mobile devices 630 and/or internet communications platforms 490, according to one embodiment of the invention. The message handler 446 communicates via one or more gateways 810 with a short message service (SMS) and one or more internet message brokers 820 associated with the one or more internet communications platforms 490. The message handler 446 sends messages to mobile devices of contacts via the SMS. The message handler 446 sends messages to contacts on the one or more internet communications platforms 490 via the one or more internet message brokers 820. For example, the internet message brokers 820 can include brokers such as Skype, Line, Viber, Facebook Messenger, Whatsapp, LinkedIn, Google Messenger or Yahoo Messenger.

In some embodiments, a software platform, such as, Rabit MQ, ApacheMQ or Twilio is implemented to send the messages.

Figure 9:
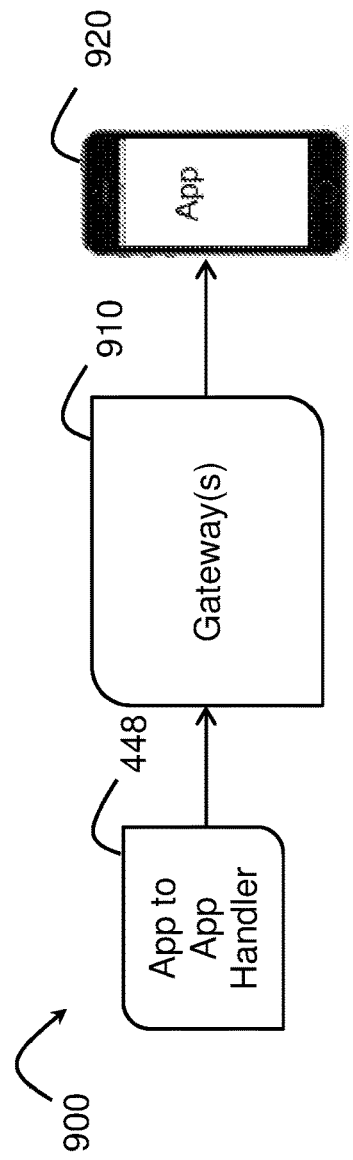
FIG. 9 illustrates a system including an app to app handler for handling requests for voice, video and/or message communications with the app on other devices, according to one embodiment of the invention.

FIG. 9 illustrates a system 900 including an app to app handler 448 for handling requests for voice, video and/or message communications with the app on other devices 920, according to one embodiment of the invention. The app to app handler 448 communicates with the apps on other devices 920 via one or more gateways 910. The one or more gateways 910 attempt to establish voice or video communications with, or send messages to, the app on the other devices 920. The one or more gateways 920 can include, for example, a voice gateway for voice calls, a video gateway for video calls and a message gateway for messages.

In some embodiments, software platforms, such as, Freeswitch, OpenSIPs, Rabit MQ, ApacheMQ and/or Twilio are implemented to establish voice or video communications or send messages.

Figure 10:
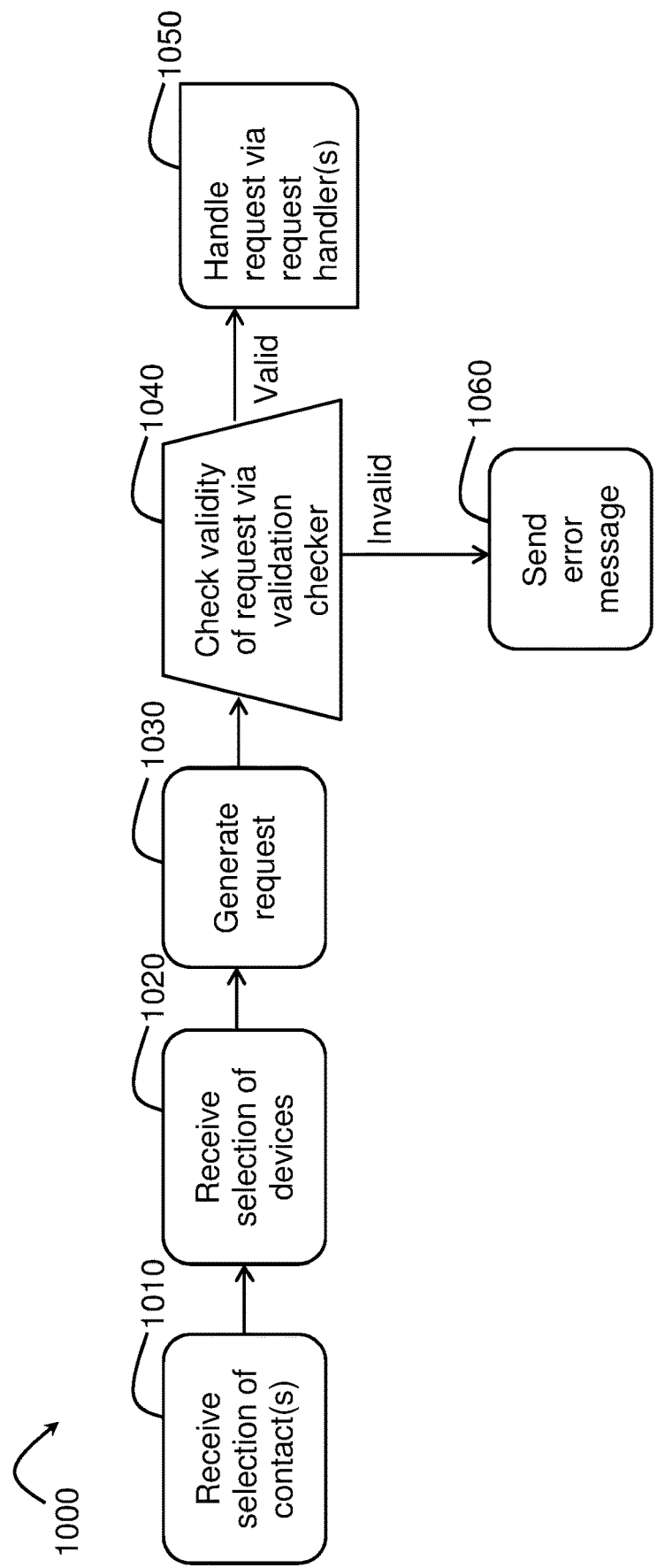
FIG. 10 illustrates a method for establishing communications with one or more communications platforms, according to one embodiment of the invention.

FIG. 10 illustrates a method 1000 for establishing communications with one or more communications platforms 490, according to one embodiment of the invention. The method 1000 comprises the following steps.

At step 1010, the method 1000 comprises receiving a selection of one or more contacts with which to communicate. For example, the contacts can be selected by a user for communication via voice, video or text.

At step 1020, the method 1000 comprises receiving a selection of one or more devices from which to establish a communication with the one or more selected contacts. For example, different devices of the user can be selected by a user.

At step 1030, the method 1000 comprises generating a request for communication based on the selected one or more contacts and one or more devices. The request will include a security key associated with the user or the one or more devices.

At step 1040, the method 1000 comprises checking the validity of request via validation checker. For example, the validity of the request is checked via the security key.

At step 1050, if the request is valid, the method 1000 comprises handling the request via the one or more request handlers to attempt to establish a communication between the one or more contacts and the one or more devices based on the request.

At step 1060, if the request is invalid, the method 1000 comprises sending an error message to the device of the user and the one or more request handlers do not attempt to establish a communication based on the request.

Thus according to the embodiment described above a user can select any one or more of various social platforms with which the user may be associated at a given point of time, and then request initiation of a real time audio conversation with a contact on multiple platforms simultaneously regardless of their presence. Thus according to this embodiment real time audio channels, and also optionally video channels, can be brokered into various formats for use over, for example, Voip networks, cellular networks and traditional PSTN networks.

In some embodiments, multiple contacts can be selected to be placed into an active call by placing the current call and any new additional users into a conference bridge on the call handler 442. The conference bridge allows audio from different contacts from the call handler 442 to be placed into one concurrent call through different gateway(s) 610. Also, in some embodiments, the conference bridge created on the call handler 442 may respond to status messages received from connected voice broker(s) 650 or VoIP network(s) 620 in order to determine not to join a call to the conference bridge. For example, a call on a VoIP network 620 will tell the Gateway(s) 610 that a call has been detected as being answered on an answering machine.

In some embodiments, one or more request handlers 440 are executed on the device 405 of the user.

Figure 11:
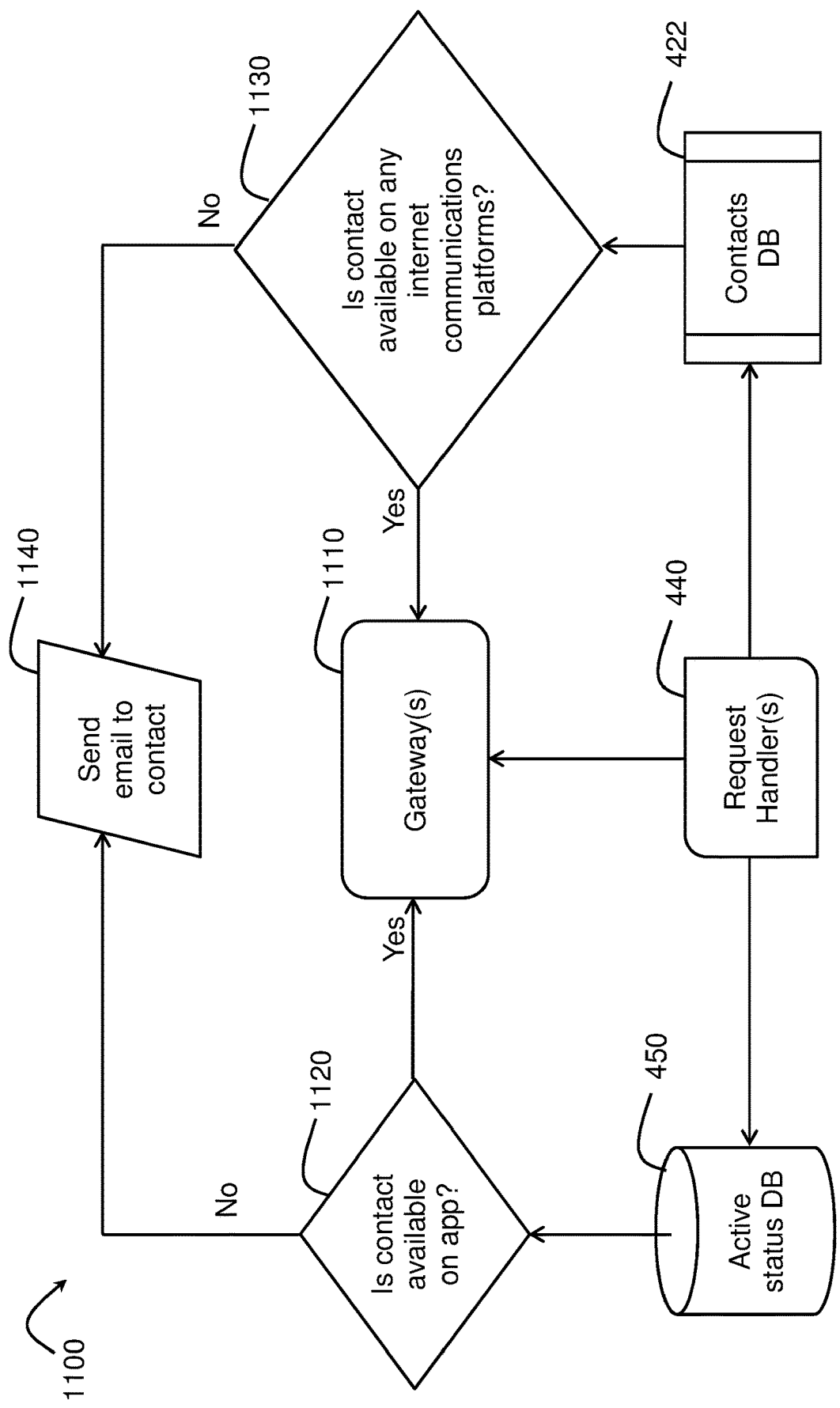
FIG. 11 illustrates a decision diagram for determining at the one or more request handlers whether the contact(s) is available on one or more internet communications platforms and/or whether the app(s) of the contact(s) is active, according to one embodiment of the invention.

FIG. 11 illustrates a decision diagram 1100 for determining at the one or more request handlers whether the contact(s) are available on one or more internet communications platforms and/or whether the app(s) of the contact(s) are active, according to one embodiment of the invention.

The one or more request handlers 440 are in communication with the contacts database 422 and the active status database 450. When the one or more request handlers 440 receive a request to establish a communication with one or more contacts, the one or more request handers 440 check the contacts database 422 to determine the internet communications platforms on which each of the one or more contacts is available.

As shown by the decision box 1130, if a contact is available on any of the internet communications platforms, the appropriate request handler 440 attempts to establish a connection via the appropriate gateway 1110 with the contact via each of the internet communications platforms on which the contact is available.

When the one or more request handlers 440 receive a request to establish a communication with one or more contacts, the one or more request handers 440 check the active status database 422 to determine whether the contact is active on the app.

As shown by the decision box 1120, if a contact is active on the app, the appropriate request handler 440 attempts to establish a connection via the appropriate gateway 1110 with the contact via the contact's app.

If the contact is not available on any internet communications platforms or not active on the app, an email may be sent to the contact by the one or more request handlers 440 notifying the contact that the user wishes contact them.

Figure 12:
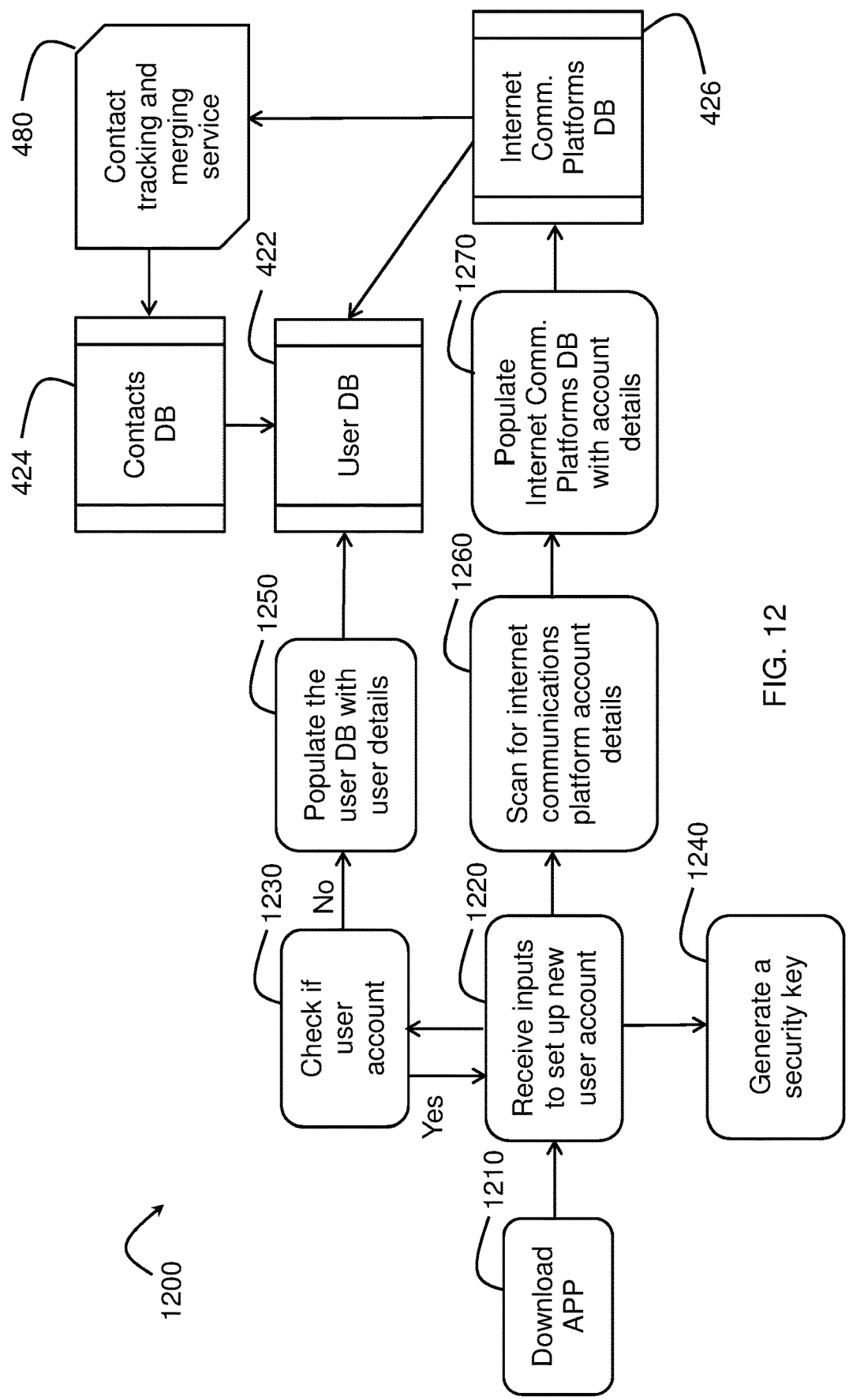
FIG. 12 illustrates a schematic of steps performed for setting up a user account from a device, according to one embodiment of the invention.

FIG. 12 illustrates a schematic 1200 of steps performed for setting up a user account from a device 405, according to one embodiment of the invention.

At step 1210, the app is downloaded to the device and executed, for example, from an internet app market, such as, the Apple iTunes store of the Google Play store.

At step 1220, the app receives inputs from the user to set up a new account. The inputs can include details of the user, such as, a username, a password and contact details of the user. The inputs can be in response to a dialog requesting details from the user displayed by the app on the user's device. In some embodiments, the username is an email address.

At step 1230, a check is performed to determine whether a corresponding user account already exists. For example, the user may have previously set up an account using the same username. If a corresponding account exists, the user is requested to set up a new account or log in using the corresponding account. If no corresponding account exists, the remaining steps are performed.

At step 1240, a security key is generated for the user. The security key is used for validating attempts to establish communications by the user, as details above.

At step 1250, the user database 422 is populated with user details based on the received inputs.

At step 1260, with the user's permission, a scan of the device is performed to identify account details for the user for one or more internet communications platforms.

At step 1270, the internet communications platforms database 426 is populated with the account details for the user for the one or more internet communications platforms.

The contact merging and tracking service 480 determines contacts of the user at the one or more internet communications platforms using the account details from the internet communications platforms database 426. The contact merging and tracking service 480 then merges the contacts and populates the contacts database 424 with the contact details of each contact for each internet communications platform. The user database 422 is populated with links to the contacts database 424 and the internet communications platforms database 426.

Figure 13:
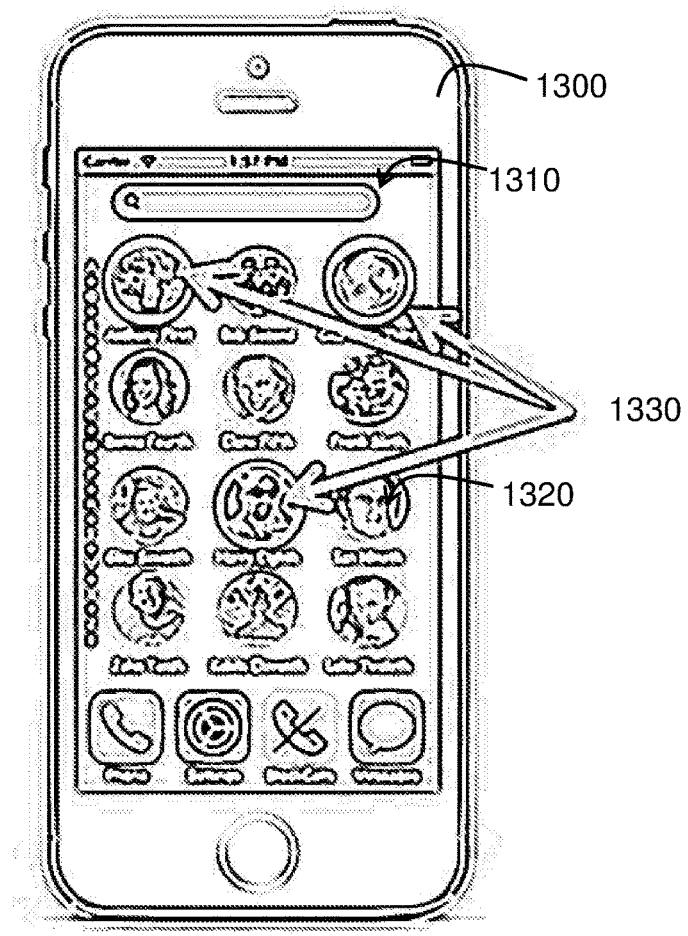
FIG. 13 illustrates a graphical user interface (GUI) for selecting contacts with which to establish a communication, according to one embodiment of the invention.

FIG. 13 illustrates a graphical user interface (GUI) 1310 for selecting contacts 1320 with which to establish a communication, according to one embodiment of the invention. The GUI 1310 is shown on a smart phone 1300. The GUI can be part of the app 410 running on the smartphone 1300.

In the GUI 1310, three contacts have been selected 1330 for a single communication, for example, a conference call. In preferred embodiments, the contacts are selected via touching the contacts on the touchscreen of the device 1300.

Figure 14:
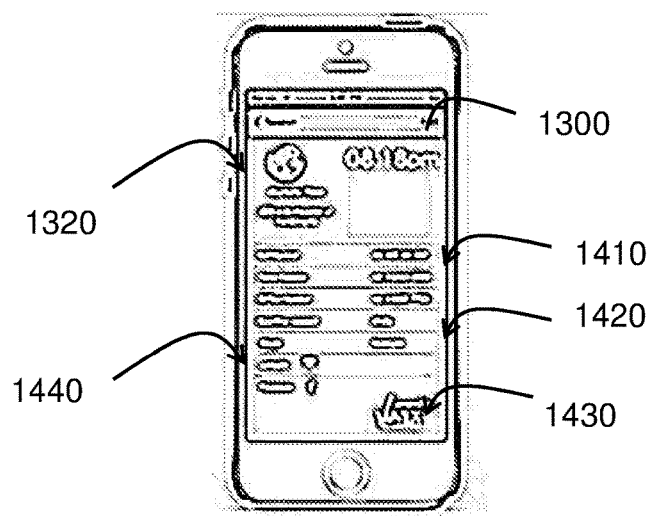
FIG. 14 illustrates a GUI for viewing and editing details of a contact, according to one embodiment of the invention.

FIG. 14 illustrates a GUI 1410 for viewing and editing details of a contact 1320, according to one embodiment of the invention. The GUI 1410 is shown on the smart phone 1300 and can be part of the app 410 running on the smartphone 1300.

A local time 1420 of the contact is shown. The local time can be based on the location of the contact stored in the contacts database 424. Contact identifiers 4130 of the contacts on a plurality of different communications platforms are shown along with an identifier of the communication platform or an identifier of an instance of the communication platform, such as, home number or office number.

Figure 15:
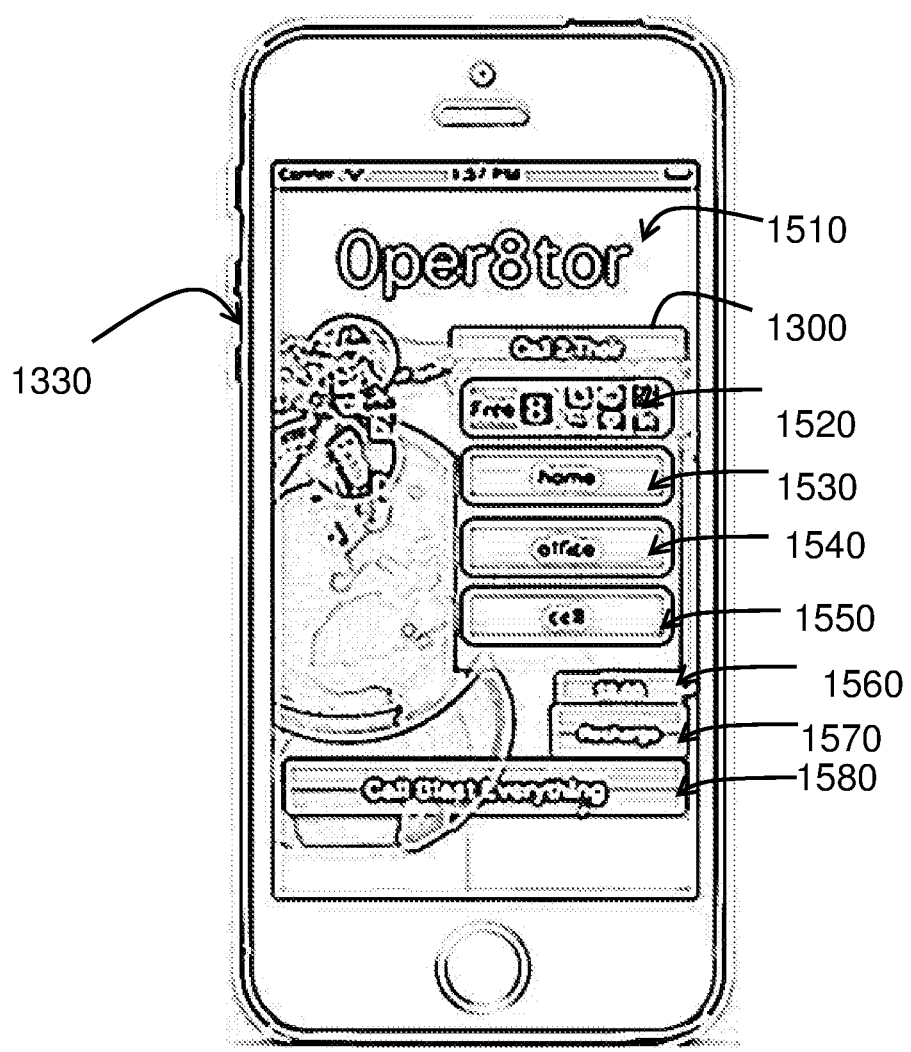
FIG. 15 illustrates a GUI for initiating a communication with one or more contacts, according to one embodiment of the invention.

FIG. 15 illustrates a GUI 1510 for initiating a communication with one or more contacts 1320, according to one embodiment of the invention. The GUI 1510 is shown on the smart phone 1300 and can be part of the app 410 running on the smartphone 1300.

The three contacts selected 1330 in the GUI 1310 are shown. A Free call button 1520 is provided for attempting to establish a communication with the selected contacts 1330 via the contact's app or via one or more internet communications platforms. A "home" button 1530 is provided for dialing the home phone of the selected contacts 1330. An "office" button 1540 is provided for dialing the office phone of the selected contacts 1330. A "cell" button 1550 is provided for dialing the mobile phone of the selected contacts 1330. A "call blast" button 1580 is provided for attempting to establish a communication with each selected contact 1330 via all communication platforms for which contact identifier are available. In a call blast each contact in the call may be connected via a different communication platform. For example, a first contact answers on their home phone, a second contact answers via Skype and a third contact answers via the app. In some embodiments, the GUI 1500 enables a different communication platform to be selected for each selected contact 1330.

The GUI 1500 shows the current credit 1560 for the user. Credit for the user can be added via a "recharge" button 1570.

Some embodiments of the present invention provide the benefits of being able to place an outbound call or make an outbound communication across a plurality of different communications platforms for a single associated contact. In some embodiments, the present invention also enables a device of the outbound call to be selected, such that a user can place an outbound call from, for example, a home phone, cell phone, work phone, the App or all of the available options.

Some embodiments of the present invention also provide centralised contacts, for example, for all business and social media networking and communication platforms, and the benefit of being able to update and merge contacts from other internet communications platforms into a single contact database.

Hence, using the present invention a user is not restricted to contacting a contact via a single communications platform from a single app. A single attempt to communicate with a contact can include a determination of where the contact is available prior to attempting to establish a communication. The communication can then be established or attempted to be establish over a plurality of different communications platforms when a contact is available.

As described, not all embodiments of the present invention necessarily include all of the advantages described herein concerning some embodiments.

In this specification, the terms "comprises", "comprising" or similar terms are intended to mean a non-exclusive inclusion, such that an apparatus that comprises a list of elements does not include those elements solely, but may well include other elements not listed.

The reference to any prior art in this specification is not, and should not be taken as, an acknowledgement or any form of suggestion that the prior art forms part of the common general knowledge.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A system for establishing communications, the system comprising:
   a processor;
   a communications device connected to the processor, the communications device configured to communicate with different electronic communications platforms; and
   a storage device connected to the processor, the storage device storing details of contacts for the different electronic communications platforms and computer readable code components configured to perform the following when executed by the processor:
   receive from a user, a first request to establish an electronic communication with a contact;
   identify via the details of contacts stored in the storage device, a contact identifier of the contact for each of a plurality of the different electronic communications platforms, wherein the contact for each of the plurality of the different electronic communications platforms is merged into a single contact database, and wherein the single contact database stores details of contacts for the different electronic communications platforms including an availability identifier for each contact for each of the different electronic communications platforms;

receive at the processor from the user, selected devices of the user with which to establish the electronic communication with the contact;

transmit via one of the selected devices of the user, a second request to establish an electronic communication comprising real time audio data with the contact simultaneously via each of the plurality of the different electronic communications platforms using each respective contact identifier;

receive via the communications device, an acceptance of the second request to establish an electronic communication with the contact via one of the plurality of different electronic communications platforms; and establish an electronic communication comprising real time audio data between the contact and the one of the selected devices of the user via the one of the plurality of different electronic communications platforms.

2. The system of claim 1, wherein an electronic communication comprising real time audio data is established between one or more contacts via the plurality of different electronic communications platforms and one or more devices of the user.

3. The system of claim 1, wherein the storage device stores details of contacts for the different electronic communications platforms including one or more of the following contact identifiers:

a user identifier for each of one or more internet communications platforms; and one or more telephone numbers.

4. The system of claim 1, wherein the storage device stores details of contacts for the different electronic communications platforms including an availability identifier for each contact for each of the different electronic communications platforms.

5. The system of claim 3, wherein the storage device stores computer readable code components configured to perform the following when executed by the processor:

transmit via the communications device to a server of each of the different electronic communications platforms for each contact, an availability request requesting an availability status of the contact on the respective electronic communications platform; and based on the response from each server to each availability request, update the availability identifier for each contact for each of the different electronic communications platforms.

6. The system of claim 1, wherein the storage device stores details of users including a user identifier and a security key for each user.

7. The system of claim 5, wherein the first request includes a user identifier and a security key and the storage device stores computer readable code components configured to perform the following when executed by the processor:

determine the security key for the user from the storage device using the user identifier;

compare the security key from the storage device with the security key of the first request; and transmit the second request only if the security keys are the same.

8. The system of claim 1, wherein the storage device stores details of users including one or more of the following for each user:

a location identifier;

an account balance; and a call history.

9. A computer implemented method for establishing a communication, the method comprising:

receiving at a processor from a user, a first request to establish an electronic communication with a contact;

identifying via a single contact database using the processor, a contact identifier of the contact for each of a plurality of different electronic communications platforms, wherein the contact for each of the plurality of the different electronic communications platforms is merged into the single contact database, and wherein the single contact database stores details of contacts for the different electronic communications platforms including an availability identifier for each contact for each of the different electronic communications platforms;

receiving at the processor from the user, selected devices of the user with which to establish the electronic communication with the contact;

transmitting via one of the selected devices of the user in communication with the processor, a second request to establish an electronic communication comprising real time audio data with the contact simultaneously via each of the plurality of different electronic communications platforms using the respective contact identifier;

receiving at the processor via the communications device, an acceptance of the second request via one of the plurality of different electronic communications platforms; and establishing an electronic communication comprising real time audio data between the contact and the one of the selected devices of the user via the one of the plurality of different electronic communications platforms.

10. The method of claim 9, wherein an electronic communication comprising real time audio data is established between one or more contacts via the plurality of different electronic communications platforms and one or more devices of the user.

11. The computer implemented method of claim 9, further comprising:

identifying using the processor, an availability of the contact on different electronic communications platforms; and selecting the plurality of different electronic communications platforms based on the availability of the contact.

12. The computer implemented method of claim 9, wherein the availability of the contact on different electronic communications platforms is identified via a presence database, and the computer implemented method further comprises:

periodically transmitting via the communications device to a server of each of the different electronic communications platforms, an availability request requesting an availability status of the contact on the respective electronic communications platform; and updating the presence database based on a response from each server to each availability request.

13. The computer implemented method of claim 9, wherein the plurality of different electronic communications platforms are selected from the following:

a landline;

a mobile telephone network; and one or more different internet communications platforms.

14. The computer implemented method of claim 9, wherein the contact identifiers include one or more of the following:

a telephone number; and a user identifier for each of one or more internet communications platforms.

15. The computer implemented method of claim 9, further comprising:

receiving at the processor, a security key associated with the first request;

comparing via the processor, the security key with a security key stored in a user database; and transmitting the second request only if the security key associated with the first request matches the security key stored in the user database.

16. A computer implemented method for establishing a communication, the method comprising:

receiving at a processor from a user, a first request to establish an electronic communication with a contact, the first request including a selection of one or more electronic communications platforms from a plurality of different electronic communications platforms;

identifying via a single contact database using the processor, a contact identifier of the contact for each of the selected electronic communications platforms, wherein the contact for each of the plurality of the different electronic communications platforms is merged into the single contact database, and wherein the single contact database stores details of contacts for the different electronic communications platforms including an availability identifier for each contact for each of the different electronic communications platforms;

receiving at the processor from the user, selected devices of the user with which to establish the electronic communication with the contact;

transmitting via one of the selected devices of the user in communication with the processor, a second request to establish an electronic communication comprising real time audio data with the contact simultaneously via each of the selected electronic communications platforms using the respective contact identifier;

receiving at the processor via the communications device, an acceptance of the second request via one of the selected electronic communications platforms; and establishing an electronic communication comprising real time audio data between the contact and the one of the selected devices of the user via the one of the selected electronic communications platforms.

* * * * *